(12) United States Patent
Ireland et al.

(10) Patent No.: US 6,958,978 B1
(45) Date of Patent: Oct. 25, 2005

(54) DIFFERENTIATED SERVICES IN PACKET-SWITCHED NETWORKS

(75) Inventors: David M Ireland, Chelmsford (GB); Paul A Kirkby, Harlow (GB); Peter G Hamer, Herts (GB)

(73) Assignee: Nortel Networks Limited, St. Laurent (CA)

( * ) Notice: Subject to any disclaimer, the term of this patent is extended or adjusted under 35 U.S.C. 154(b) by 951 days.

(21) Appl. No.: 09/888,889

(22) Filed: Jun. 25, 2001

(51) Int. Cl.[7] .................. G01R 31/08; H04L 12/28; H04J 3/16

(52) U.S. Cl. ............. 370/252; 370/401; 370/468; 398/29

(58) Field of Search ................. 370/468, 401, 370/252, 356, 230; 398/25, 29, 33, 49

(56) References Cited

U.S. PATENT DOCUMENTS

| | | | |
|---|---|---|---|
| 6,229,788 B1 * | 5/2001 | Graves et al. | 370/230 |
| 2002/0131365 A1 * | 9/2002 | Barker et al. | 370/235 |
| 2002/0186434 A1 * | 12/2002 | Roorda et al. | 359/128 |

* cited by examiner

Primary Examiner—Duc Ho
(74) Attorney, Agent, or Firm—Barnes & Thornburg

(57) ABSTRACT

Internet protocol based transmissions have historically been transmitted on a best efforts basis. There are proposals to provide differentiated services to allow different packets to be delivered with different service qualities depending on the bandwidth requirements of a particular flow. By performing bandwidth monitoring within the core network and performing packet dropping and/or queuing at the network ingress, the need for packet dropping and/or queuing within the core network is removed and furthermore the core network resources are not used by packets which will not be delivered to their destination but will instead be dropped within the core network.

15 Claims, 2 Drawing Sheets

User Traffic flows and WtP

User Data

DIFFERENTIATED SERVICES IN PACKET-SWITCHED NETWORKS

FIELD OF THE INVENTION

This invention relates to a method and apparatus for controlling bandwidth usage in a packet-switched network. Recent proposals to improve the flexibility of transmission of data in packet-switched networks such as those based on the Internet protocol (IP) have included proposals to provide so-called "differentiated services" over such networks. The principle aim of a differentiated service is to allow different users to have different levels of service from the same network. Typically the different levels of service are differentiated by guarantees concerning a minimum guaranteed bandwidth which will always be received at the destination (assured forwarding) and an allowed level of traffic above the pre-determined minimum guaranteed bandwidth which will also in certain circumstances be transmitted.

TECHNICAL BACKGROUND

Internet Engineering Task Force Request For Comments (RFC) 2475 sets out an architecture for differentiated services in the IP layer of a communications network. Also, RFC 2597 sets out an assured forwarding schema using differentiated services in the IP layer of a network. However, the proposals to date have relied on so-called "per hop" behaviour (PHB). This means that each router in the core network is required to operate according to the differentiated services protocols and in particular, is required to be able queue and/or drop packets in order to limit bandwidth travelling around the network to provide the differentiated services. In the case of core networks using photonic switches, this is presently not feasible since queuing and packet dropping of this type presently requires an optical-electrical-optical conversion which is prohibitively expensive. In order to implement the differential services, assured forwarding proposals in an optical (or photonic) network in which switching and routing within the core network is carried out purely in the optical domain, it is necessary to overcome the need for intelligent switches which can drop and/or queue packets.

SUMMARY OF THE INVENTION

In accordance with a first aspect of the invention there is provided a method of controlling bandwidth usage in a packet-switched network comprising measuring overall network performance to calculate a plurality of metrics representative of bandwidth usage in the core network, predetermining a guaranteed bandwidth value for each user which is representative of a guaranteed bandwidth usage level, receiving data at a network ingress and monitoring bandwidth usage of a plurality of network users at the network ingress to determine the bandwidth usage of each user in relation to the respective guaranteed bandwidth values, deciding whether to pass packets into the network for each user which has not exceeded its guaranteed bandwidth usage, and deciding whether to pass any excess packets which represent bandwidth usage in excess of a user's guaranteed bandwidth, into the network based on at least one of the said metrics.

By measuring network performance in the core network and passing this information back to the network ingress, it is possible to emulate the Per Domain Behaviour (PDB) which the prior art proposals achieve, without requiring scheduling to be carried out in the core routers (such as photonic routers) and also without having excessively long queues within the core routers. Furthermore, by using a plurality of metrics concerning bandwidth usage within the network (as described in more detail below) it is possible to improve the performance of the control loop and thereby to maximise network usage whilst grading quality of service for different users.

In accordance with a second aspect of the invention there is provided an edge-based node for a packet switched network comprising an ingress arranged to receive data from a plurality of users, an egress arranged to feed data into a packet switched network, a metrics input arranged to receive a plurality of metrics representing a plurality of statistical measurements of bandwidth usage in the core network, and a resource processor arranged to control the flow of data from the ingress to the egress, the resource processor being operable to receive data from the ingress and to monitor the bandwidth usage of a plurality of network users connected to the ingress to determine the bandwidth usage of each user in relation to respective guaranteed bandwidth values associated with each user, the resource controller being further operable to decide whether to pass packets to the egress for each user which has not exceeded its guaranteed bandwidth usage, and to decide whether to pass any excess packets which represent bandwidth usage in excess of a user's guaranteed bandwidth, to the egress based on at least one of the said metrics.

In a third aspect, the invention provides Software which when executed on suitable hardware operates to control bandwidth usage in a packet-switched network by causing the hardware to measure overall network performance to calculate a plurality of metrics representative of bandwidth usage in the core network, predetermine a guaranteed bandwidth value for each user which is representative of a guaranteed bandwidth usage level, receive data at a network ingress and monitoring bandwidth usage of a plurality of network users at the network ingress to determine the bandwidth usage of each user in relation to the respective guaranteed bandwidth values, decide whether to pass packets, into the network for each user which has not exceeded its guaranteed bandwidth usage, and decide whether to pass any excess packets which represent bandwidth usage in excess of a users guaranteed bandwidth, into the network based on at least one of the said metrics.

In a further aspect, the invention provides a packet-switched network including an edge-based node, the node comprising an ingress arranged to receive data from a plurality of users, an egress arranged to feed data into a packet switched network, a metrics input arranged to receive a plurality of metrics representing a plurality of statistical measurements of bandwidth usage in the core network, and a resource processor arranged to control the flow of data from the ingress to the egress, the resource processor being operable to receive data from the ingress and to monitor the bandwidth usage of a plurality of network users connected to the ingress to determine the bandwidth usage of each user in relation to respective guaranteed bandwidth values associated with each user, the resource controller being further operable to decide whether to pass packets to the egress for each user which has not exceeded its guaranteed bandwidth usage, and to decide whether to pass any excess packets which represent bandwidth usage in excess of a user's guaranteed bandwidth, to the egress based on at least one of the said metrics.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

Figure 1:
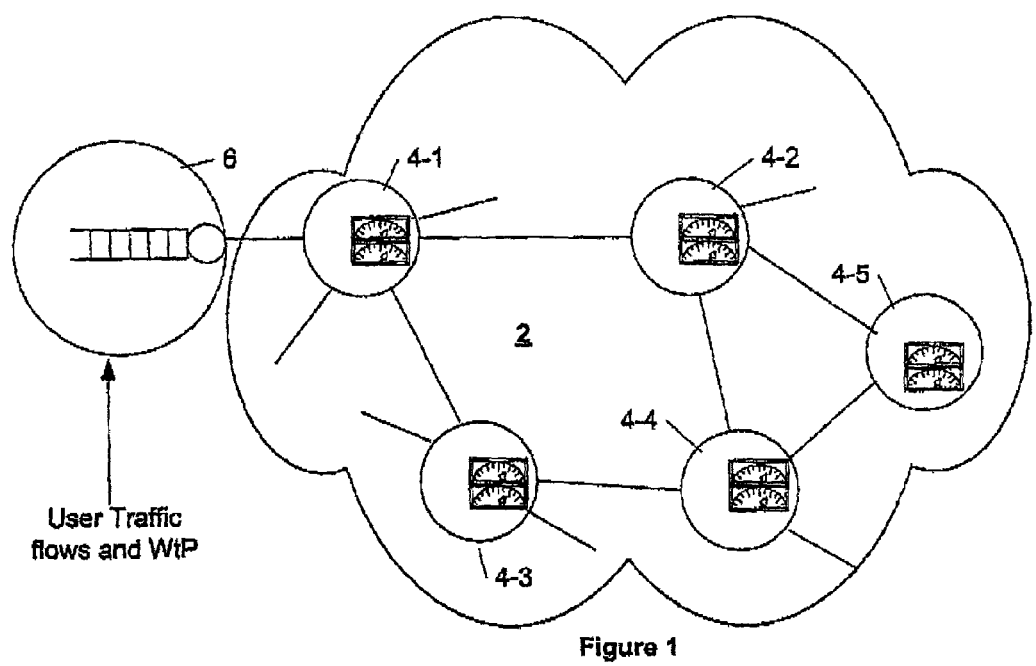
FIG. 1 is a schematic diagram of a portion of a photonic network in accordance with the invention.

With reference to FIG. 1 a photonic network 2 has photonic core routers 4-1, 4-2, 4-3, 4-4 and 4-5 which are operable to collect measurements such as aggregate flow for each class on each of its output ports. The measurements from the core routers 4-1 to 4-5 are passed back typically in the form of respective mean and variance metrics, to a dynamic resource controller 6 located at an ingress of the network 2. The creation of these metrics and corresponding n-prices is described in detail in co-pending co-assigned U.S. application No. 09/750903 filed on 28 Dec. 2000 the, disclosure of which is incorporated herein by reference.

The dynamic resource controller receives user traffic and one or more "willingness to pay" (WtP) associated with each user.

The dynamic resource controller 6 also includes a scheduler and active queue management which is used to control flows as described in detail below. The scheduler may, for example, be based on the leaky or token bucket concept in which a user is permitted a pre-determined regular average bandwidth and a pre-determined burst bandwidth which may allow a user to transmit above its average bandwidth for a short period of time. These concepts are not described in detail herein. Briefly, the dynamic resource controller needs to be able to drop and/or queue incoming packets in order to prevent traffic from particular users from entering the core network. It needs to be able to do this on the basis of mean and burst bandwidths or some other suitable metrics.

In overview, the combination of the metrics returned from the core routers 4-1 to 4-5, to the dynamic resource controller 6 (DRC) allows the DRC to operate to emulate the assured forwarding Per Domain Behaviour known in the prior art, but without requiring the detailed Per Hop behaviour of the prior art which, as discussed above, is expensive to implement in a network such as a photonic network.

In the preferred embodiment, two measurements of aggregate packet date traffic flows within the core network are collected; namely a measure of central tendency (for example mean data rate or effective bandwidth) and a measure of dispersion (for example variance standard deviation, range or estimated error of the central tendency). These measurements are translated to respective n-prices using an appropriate pricing function and are then summed for each network path. This conversion to n-prices may take place within the dynamic resource controller 6 or may take place externally.

The total n-prices for each network path are used to control traffic entering the network at the network ingress (the dynamic resource controller 6). The dynamic resource controller 6 polices and conditions incoming user traffic based on two controls. As mentioned above, a token bucket filter is one option for controlling data flows and in that case the mean rate n-price is used to set the sustained data rate control and the variance n-price is used to set the burst size control of the token bucket filter.

The setting of the sustained and permitted excess burst size in the token bucket filter is performed also with reference to a willingness to pay function provided by the user which is specified both in terms of a willingness to pay for average or guaranteed bandwidth traffic and a willingness to pay function for bursty traffic. This allows the dynamic resource controller 6 to balance service provision between competing users.

In operation, this arrangement has the effect of admitting large deviations in the traffic rates of flows which traverse links with a low utilisation (and hence a large head room) but reducing the permitted deviations as the links become more heavily loaded. With heavier loading, the more bursty flows are penalised more heavily by a higher overall price which is effected by the end price for bursty traffic being increased at a greater rate than the end price for mean rate data.

Figure 2:
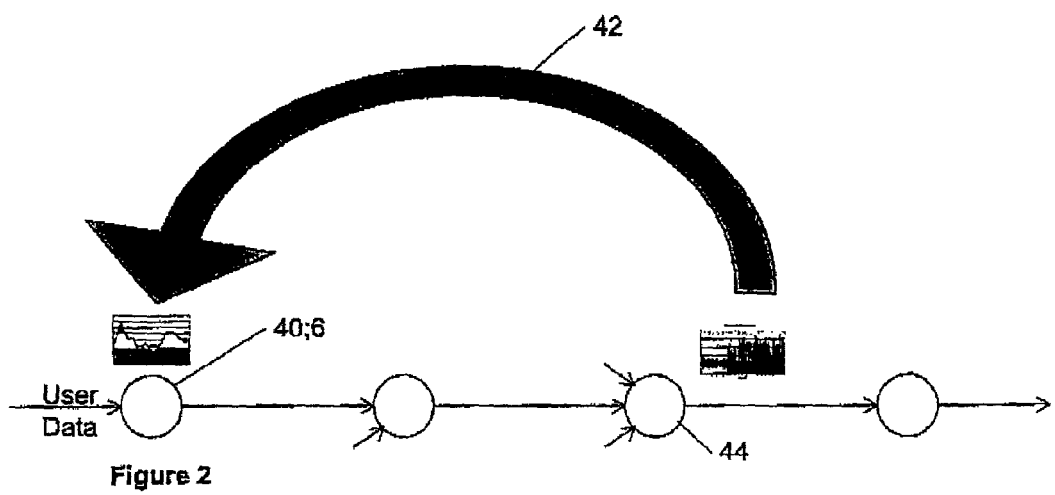
FIG. 2 is a schematic block diagram of a dynamic resource controller in accordance with the invention.

With reference to FIG. 2, the mechanism described above may be used to implement the so-called coloured assured forwarding AF behaviour which is presently being proposed for differentiated services in the IP layer.

In the coloured proposal, it is proposed to assign two (optionally three) pre-defined levels of service to the colours green, (optionally yellow) and red respectively. The DS field of a packet is then flagged using a two bit code, with one of the colours. A packet flagged green should always be forwarded since it is within the guaranteed maximum bandwidth of the user. A packet flagged yellow is a packet which is above the guaranteed bandwidth level but within a permitted burstiness level and is liable to be dropped. A packet flagged red is above the permitted burst level and is also liable to be dropped. It is more likely to be dropped than a "yellow" packet. These flags are used in the proposed Per Hop Behaviour to allow core routers to determine what action to take in relation to that packet. As noted above, this technique is not suitable for use in networks such as photonic networks in which the provision of queuing and/or packet dropping functionality within the core network is expensive.

With reference to the figure, an ingress router 40 receives user data and also receives metrics 42 (typically being respective, mean and variance metrics) which are used in the way described above to emulate the coloured Per Hop Behaviour of the prior art proposal. Thus, rather than flagging different packets with different "colours" using the DS field of each packet the packets are stopped at the ingress if they do not meet the required traffic flow criteria (as set by the network metrics and the user willingness to pay parameters). Thus, the coloured Per Domain Behaviour is retained whilst avoiding the need to have the detailed Per Hop Behaviour implemented within the core network.

Typically, the two metrics produced in the way described in co-pending U.S. patent application No. 09/750903 are mapped from the mean to the "green" colour and from the variance to the "red" colour respectively. In order to implement a multi-level drop scheme (for example including a "yellow" colour) a "weighting function" as described in the co-pending U.S. patent application, may be applied in order to derive a plurality of acceptable levels of burstiness and respective n-prices for those burstiness levels.

It will be appreciated that not only does the invention described above have the advantage of being usable with relatively unintelligent core network routers such as photonic network routers, but that the efficiency of the network is improved as well.

It will be noted that packets are not admitted by the ingress controller into the core network unless there is bandwidth to deliver them across the network. Thus core bandwidth is not absorbed by packets traversing the network which are then discarded before reaching their destination. The dropping of packets at the ingress router rather than at intermediate switches or routers prevents dropped packets from consuming system resources. In particular, packets which are going to be dropped do not delay later packets in the same flow.

Furthermore, dropping packets at an ingress router allows more informed decisions to be taken concerning packet drop and packet drop pattern. This may be used to increase the chance of "just in time" packets being sent successfully and may also be used to allow tradeoffs between the dropping of different packets in the same flow. Thus the burstiness of the drop pattern may be reduced by anticipating the congestion in the ingress queue.

Therefore with these additional advantages, the invention provides a service which is superior to that provided by the conventional AF PHB based implementations.

Figure 3:
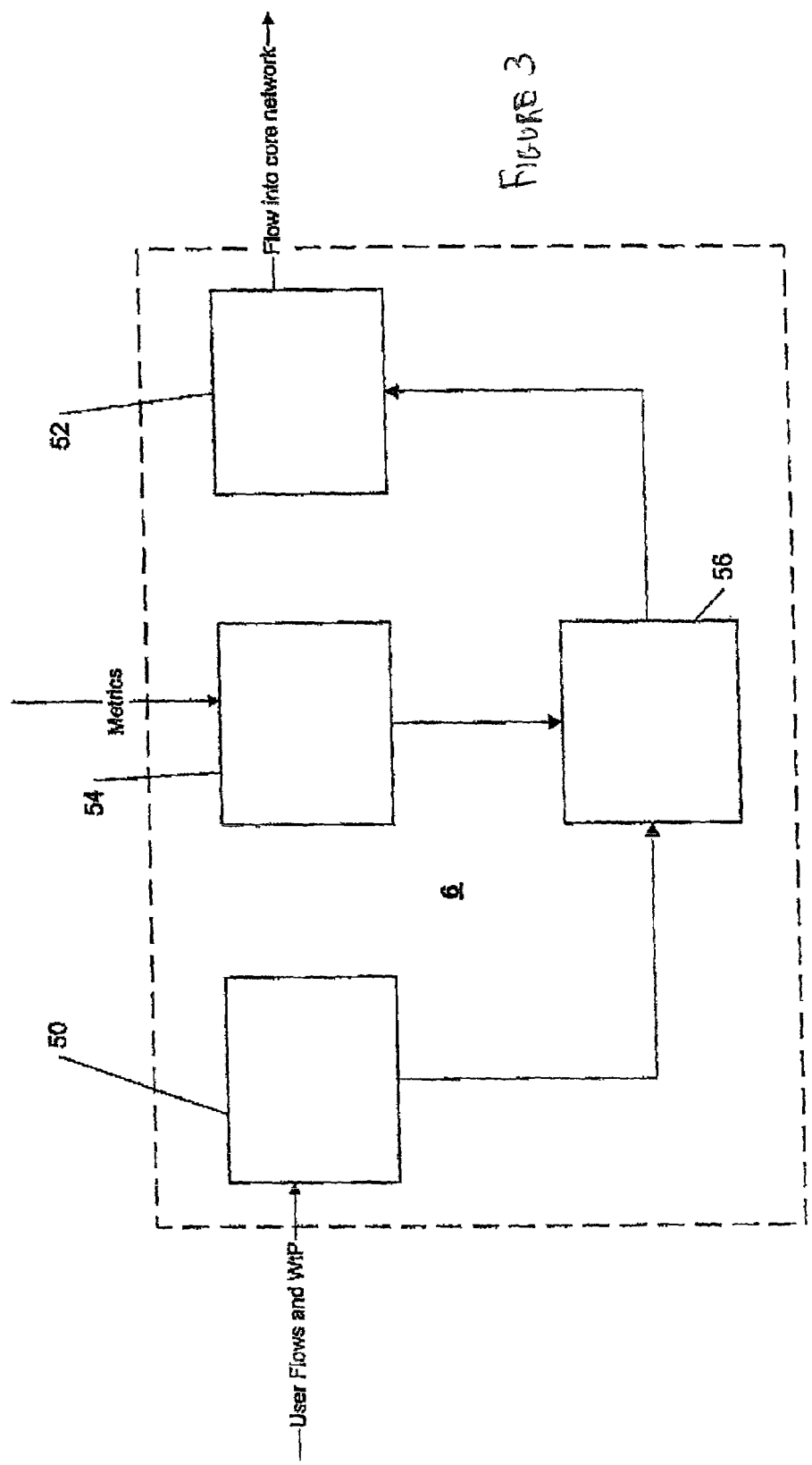
FIG. 3 is a schematic diagram showing emulated differentiated services assured forwarding coloured behaviour in a photonic network.

With reference to FIG. 3, an ingress controller or dynamic resource controller of the type shown in FIG. 1 is shown in more detail. The resource controller has an ingress 50 which is arranged to receive data from a plurality of users. The data is received in conjunction with willingness to pay parameters which relate to the bandwidth requirements of a users mean bandwidth and burstiness.

The DRC also has an egress 52 from which traffic is allowed to flow into the core network.

A metrics input 54 receives metrics (typically respective, mean and variance metrics) measured within the core network. A resource processor 56 operates to control the flow of data between the ingress 50 and egress 52 in the way described above. Thus, the resource processor receives metrics and generates end prices or may receive end prices directly which it uses in conjunction with the willingness to pay parameters of each user traffic flow to determine which packets are queued and/or dropped or are passed to the egress.

What is claimed is:

1. A method of controlling bandwidth usage in a packet-switched network comprising:
   (a) measuring overall network performance to calculate a plurality of metrics representative of bandwidth usage in the core network,
   (b) predetermining a guaranteed bandwidth value for a network user which is representative of a guaranteed bandwidth usage level,
   (c) receiving data at a network ingress and monitoring bandwidth usage of the network user at the network ingress to determine the bandwidth usage of the user in relation to the respective guaranteed bandwidth value,
   (d) deciding whether to pass packets into the network for the user which represent bandwidth which does not exceed its guaranteed bandwidth usage, and
   (e) deciding whether to pass any excess packets which represent bandwidth usage in excess of the user's guaranteed bandwidth, into the network based on at least one of the said metrics.

2. A method according to claim 1, wherein the overall network performance is measured by monitoring traffic flowing through at least one core router in the packet switched network.

3. A method according to claim 1, wherein the metrics include a measure of central tendency and a measure of dispersion.

4. A method according to claim 3, wherein the measure of central tendency is used to derive an n-price for average bandwidth traffic which is fed back to the ingress and used in conjunction with a respective average willingness-to-pay parameter associated with each user, to decide whether to pass date corresponding to the guaranteed bandwidth for each user into the network.

5. A method according to claim 3, wherein the measure of dispersion is used to derive an n-price for burst traffic which is fed back to the ingress and used in conjunction with a respective burst willingness-to-pay parameter associated with each user, to decide whether to pass excess packets for each user into the network.

6. An edge-based node for a packet switched network comprising:
   (a) an ingress arranged to receive data from a plurality of users,
   (b) an egress arranged to feed data into a packet switched network,
   (c) a metrics input arranged to receive a plurality of metrics representing a plurality of statistical measurements of bandwidth usage in the core network, and
   (d) a resource processor arranged to control the flow of data from the ingress to the egress,
   the resource processor being operable to receive data from the ingress and to monitor the bandwidth usage of a plurality of network users connected to the ingress to determine the bandwidth usage of each user in relation to respective guaranteed bandwidth values associated with each user, the resource processor being further operable to decide whether to pass packets to the egress for each user which has not exceeded its guaranteed bandwidth usage, and to decide whether to pass any excess packets which represent bandwidth usage in excess of a user's guaranteed bandwidth, to the egress based on at least one of the said metrics.

7. A node according to claim 6, wherein the resource processor is operable to derive an n-price for average bandwidth traffic, wherein each user has an associated willingness-to-pay value for the transmission of its guaranteed bandwidth and wherein the resource processor is further operable to decide whether to pass packets to the egress for each user which has not exceeded its guaranteed bandwidth usage based on a comparison of the average bandwidth traffic n-price and each users' guaranteed bandwidth willingness-to-pay values.

8. A node according to claim 6, wherein the resource processor is operable to derive an n-price for burst traffic, wherein each user has an associated willingness-to-pay value for the transmission of any excess packets which represent bandwidth usage in excess of a user's guaranteed bandwidth, and wherein the resource processor is further operable to decide whether to excess pass packets to the egress which represent bandwidth usage in excess of a user's guaranteed bandwidth, based on a comparison of the burst traffic n-price and each users' excess packets willingness-to-pay value.

9. Software which when executed on suitable hardware operates to control bandwidth usage in a packet-switched network by causing the hardware to:
   (a) measure overall network performance to calculate a plurality of metrics representative of bandwidth usage in the core network, (b) predetermine a guaranteed bandwidth value for each user which is representative of a guaranteed bandwidth usage level, (c) receive data at a network ingress and monitoring bandwidth usage of a plurality of network users at the network ingress to determine the bandwidth, usage of each user in relation to the respective guaranteed bandwidth values, (d) decide whether to pass packets into the network for each user which has not exceeded its guaranteed bandwidth usage, and (e) decide whether to pass any excess packets which represent bandwidth usage in excess of a user's guaranteed bandwidth, into the network based on at least one of the said metrics.

10. A packet-switched network including an edge-based node, the node comprising:

(a) an ingress arranged to receive data from a plurality of users, (b) an egress arranged to feed data into a packet switched network, (c) a metrics input arranged to receive a plurality of metrics representing a plurality of statistical measurements of bandwidth usage in the core network, and (d) a resource processor arranged to control the flow of data from the ingress to the egress, the resource processor being operable to receive data from the ingress and to monitor the bandwidth usage of a plurality of network users connected to the ingress to determine the bandwidth usage of each user in relation to respective guaranteed bandwidth values associated with each user, the resource processor being further operable to decide whether to pass packets to the egress for each user which has not exceeded its guaranteed bandwidth usage, and to decide whether to pass any excess packets which represent bandwidth usage in excess of a user's guaranteed bandwidth, to the egress based on at least one of the said metrics.

11. A network according to claim 10, including a node in the core network operable to measure bandwidth usage and produce data processable to produce a metric for input to the metrics input.

12. A network according to claim 10, wherein the network is an optical network having nodes in the network core which are photonic nodes.

13. A network according to claim 12, wherein routing in the core network is carried out in the optical domain.

14. A network according to claim 10, wherein queuing of packets occurs only in edge-based network nodes.

15. A network according to claim 10, wherein dropping of packets occurs only in edge-based network nodes.

* * * * *